United States Patent

Takagi et al.

[11] Patent Number: 6,091,733
[45] Date of Patent: Jul. 18, 2000

[54] COMMUNICATION DEVICE USING COMMUNICATION PROTOCOL INCLUDING TRANSPORT LAYER AND COMMUNICATION METHOD USING COMMUNICATION PROTOCOL INCLUDING TRANSPORT LAYER

[75] Inventors: Masahiro Takagi, Tokyo; Eiji Kamagata, Kanagawa-ken, both of Japan

[73] Assignee: Kabushiki Kaisha Toshiba, Kawasaki, Japan

[21] Appl. No.: 08/999,330

[22] Filed: Dec. 29, 1997

[30] Foreign Application Priority Data

Jan. 9, 1997 [JP] Japan ................................. 9-002365

[51] Int. Cl.[7] ..................................................... H04J 3/24
[52] U.S. Cl. .......................................... 370/401; 370/474
[58] Field of Search ..................................... 370/401, 402, 370/403, 465, 469, 471, 473, 474

[56] References Cited

U.S. PATENT DOCUMENTS 5,931,961  8/1999  Ranganathan et al. .................. 714/712

OTHER PUBLICATIONS

K. Brown, et al., "A Network Architecture for Mobile Computing", IEEE Infocom '96, pp. 1388–1396, Mar. 1996.

*Primary Examiner*—Joseph L. Felber
*Attorney, Agent, or Firm*—Oblon, Spivak, McClelland, Maier & Neustadt, P.C.

[57] ABSTRACT

A communication device/method inputs a first transport layer protocol data unit; creates a second transport layer protocol data unit based on the first transport layer protocol data unit, the second transport layer protocol data unit containing data as contained in the first transport layer protocol data unit and having a protocol data unit size different from a size of the first transport layer protocol data unit; and outputs the second transport layer protocol data unit to a network.

21 Claims, 14 Drawing Sheets

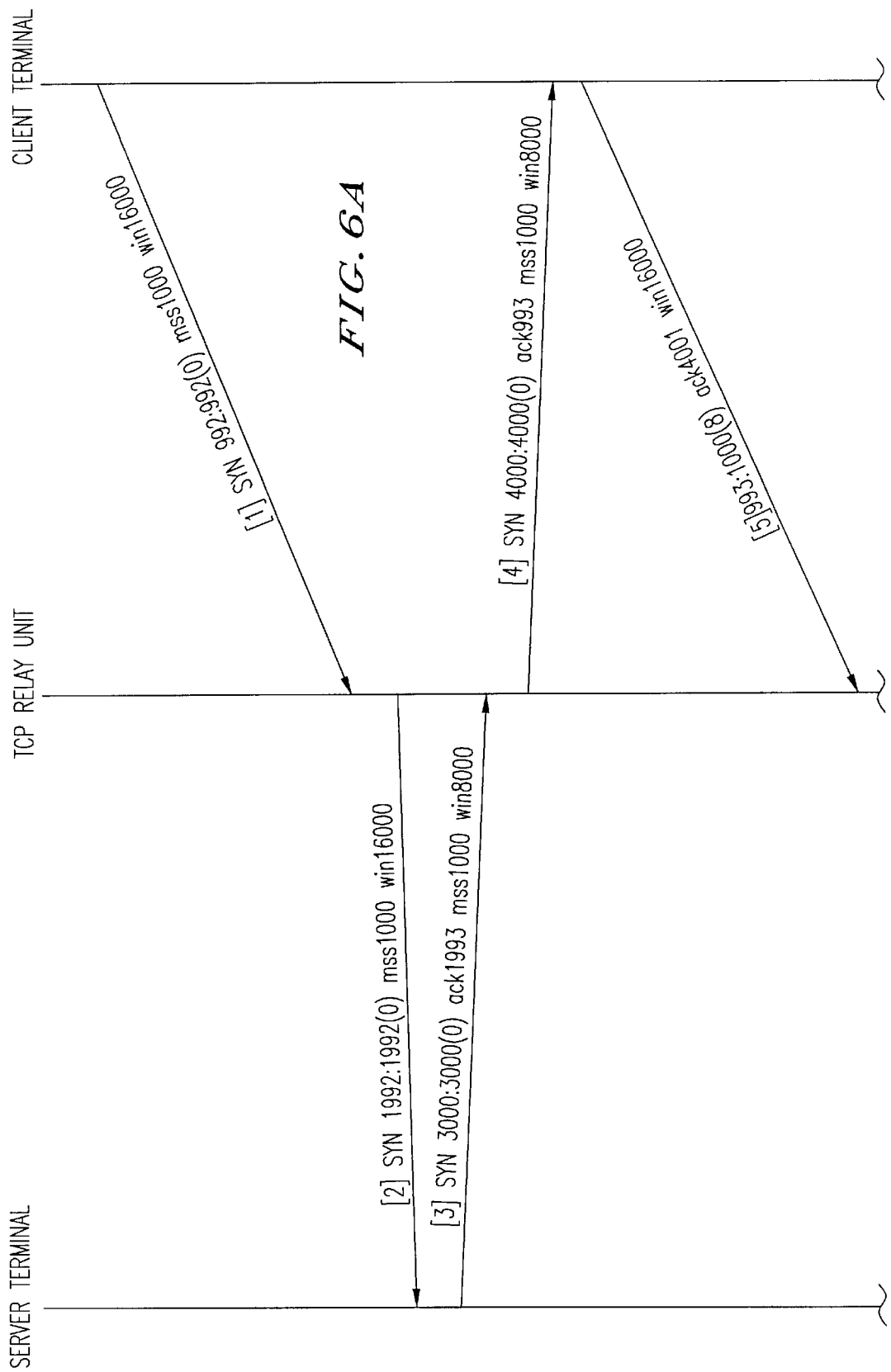

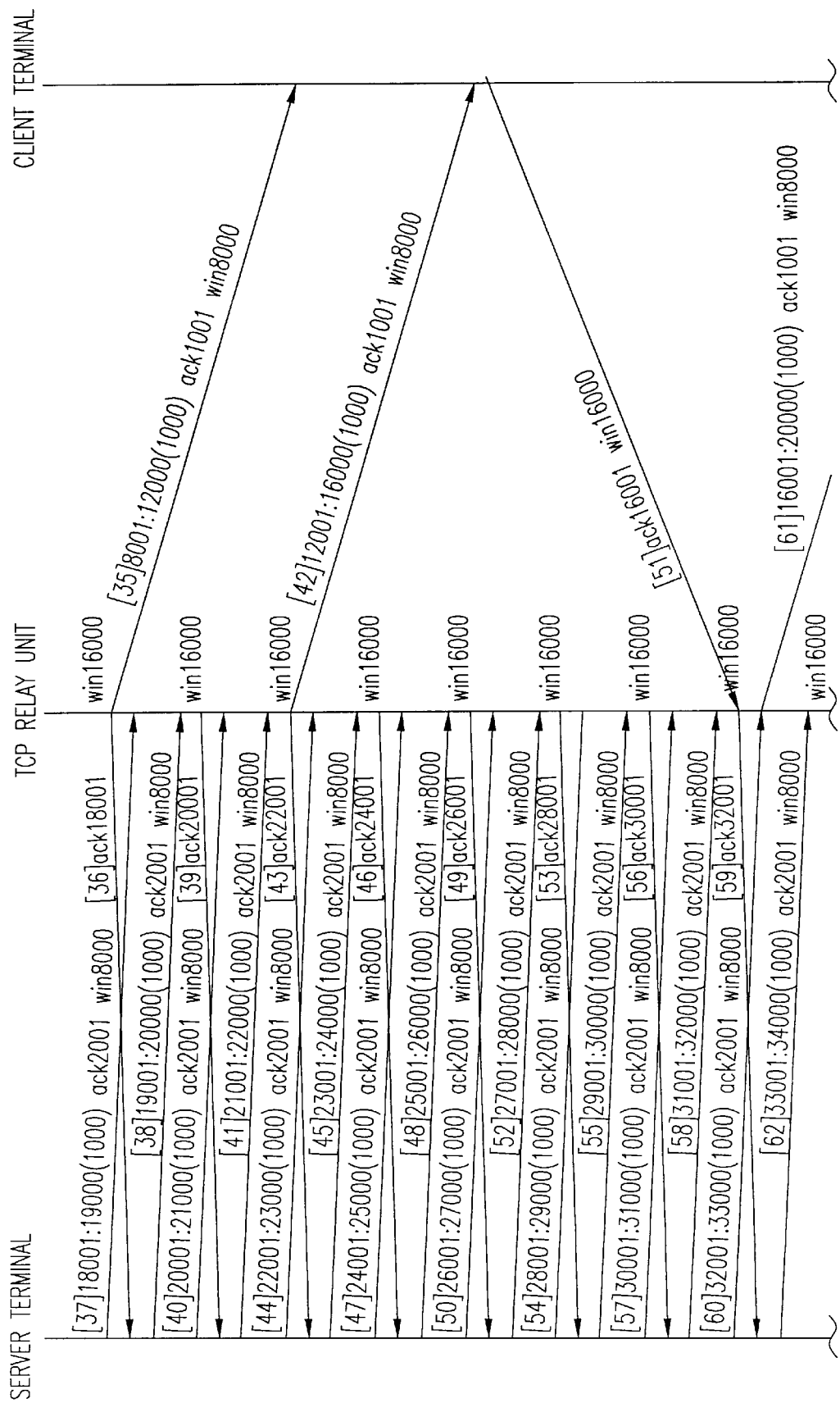

COMMUNICATION DEVICE USING COMMUNICATION PROTOCOL INCLUDING TRANSPORT LAYER AND COMMUNICATION METHOD USING COMMUNICATION PROTOCOL INCLUDING TRANSPORT LAYER

BACKGROUND OF THE INVENTION

Field of the Invention

The present invention relates to a communication device/method using a communication protocol including a transport layer. The TCP/IP (Transmission Control Protocol/Internet Protocol) represents the communication protocol including a transport layer. An example of a conventional TCP/IP network system of the conventional art is shown in FIG. 1.

In the network system, as shown in FIG. 1, a network 610 and a different network 620 are connected to each other through an IP router 150 so that terminals 131 and 132 belonging to the network 610 and terminals 141, 142 and 143 belonging to the network 620 may communicate with each other. The IP router 150 receives an IP datagram from the interface of an IP address a.a.a.1 or a.a.b.1, refers to a routing table by using a destination IP address of the IP header of the IP datagram as a key, and outputs the IP datagram to a proper interface. For example, the IP datagram, as transmitted from the terminal 131 of an IP address a.a.a.2 to the terminal 141 of an IP address a.a.b.2, is received by the a.a.a.1 interface of the IP router 150 and is outputted to the a.a.b.1 interface to reach the terminal 141.

Noting that a number of downloads are performed of data from a server terminal to client terminals in many multimedia services utilizing networks, there has been recently developed an asymmetric access network in which a bandwidth of inputs to client terminals is extremely wider than that of outputs from client terminals.

In this network having the asymmetric transmission speed, however, the throughput of the TCP in the direction from the server to the clients may be lowered, because the recommended TCP implementation method has an algorithm "at least one ACK (Acknowledgment) is returned for two TCP segments". This algorithm determines the effective bandwidth from the server to the clients in the following manner.

The time period for the ACK to be transmitted is the division of the bandwidth (Vup) in the direction from the clients to the server by the ACK size (Sack). For this time period, the data of 2×TCP maximum segment size (mss) can be transmitted. The bandwidth (Vdown) in the direction from the server to the clients is expressed by Vup×(2×mss)/Sack and cannot be exceeded. Thus, the throughput in the direction from the server to the clients has this upper limit.

If, therefore, the algorithm that one ACK is returned for two TCP segments is changed to return one ACK for N-number (N>2) of TCP segments thereby to reduce the number of ACKs, the throughput may be improved, but this breaks the recommended TCP implementation method. Moreover, it is difficult to change the TCP implementation for all terminals.

More generally, the TCP segment is called the transport layer protocol data unit, and the IP datagram is called the network layer protocol data unit.

SUMMARY OF THE INVENTION

It is therefore an object of the present invention to provide a scheme for improving the throughput of the communication using a transport layer protocol (e.g., TCP), especially in a network having an asymmetric channel, while terminals can still use an ordinary implementation method of the transport layer protocol.

According to one aspect of the present invention, there is provided a communication device, comprising: a first interface for inputting a first transport layer protocol data unit; a module for creating a second transport layer protocol data unit based on the first transport layer protocol data unit, the second transport layer protocol data unit containing data as contained in the first transport layer protocol data unit and having a protocol data unit size different from a size of the first transport layer protocol data unit; and a second interface for outputting the second transport layer protocol data unit to a network.

According to another aspect of the present invention, there is provided a communication method, comprising steps of: inputting a first transport layer protocol data unit; creating a second transport layer protocol data unit based on the first transport layer protocol data unit, the second transport layer protocol data unit containing data as contained in the first transport layer protocol data unit and having a protocol data unit size different from a size of the first transport layer protocol data unit; and outputting the second transport layer protocol data unit to a network.

Other features and advantage of the present invention will be become apparent from the following description taken in conjunction with the accompanying drawings.

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed descriptions when considered in connection with the accompanying drawings, wherein.

DETAILED DESCRIPTION OF THE PREFERRED EMBODIMENTS

Figure 1:
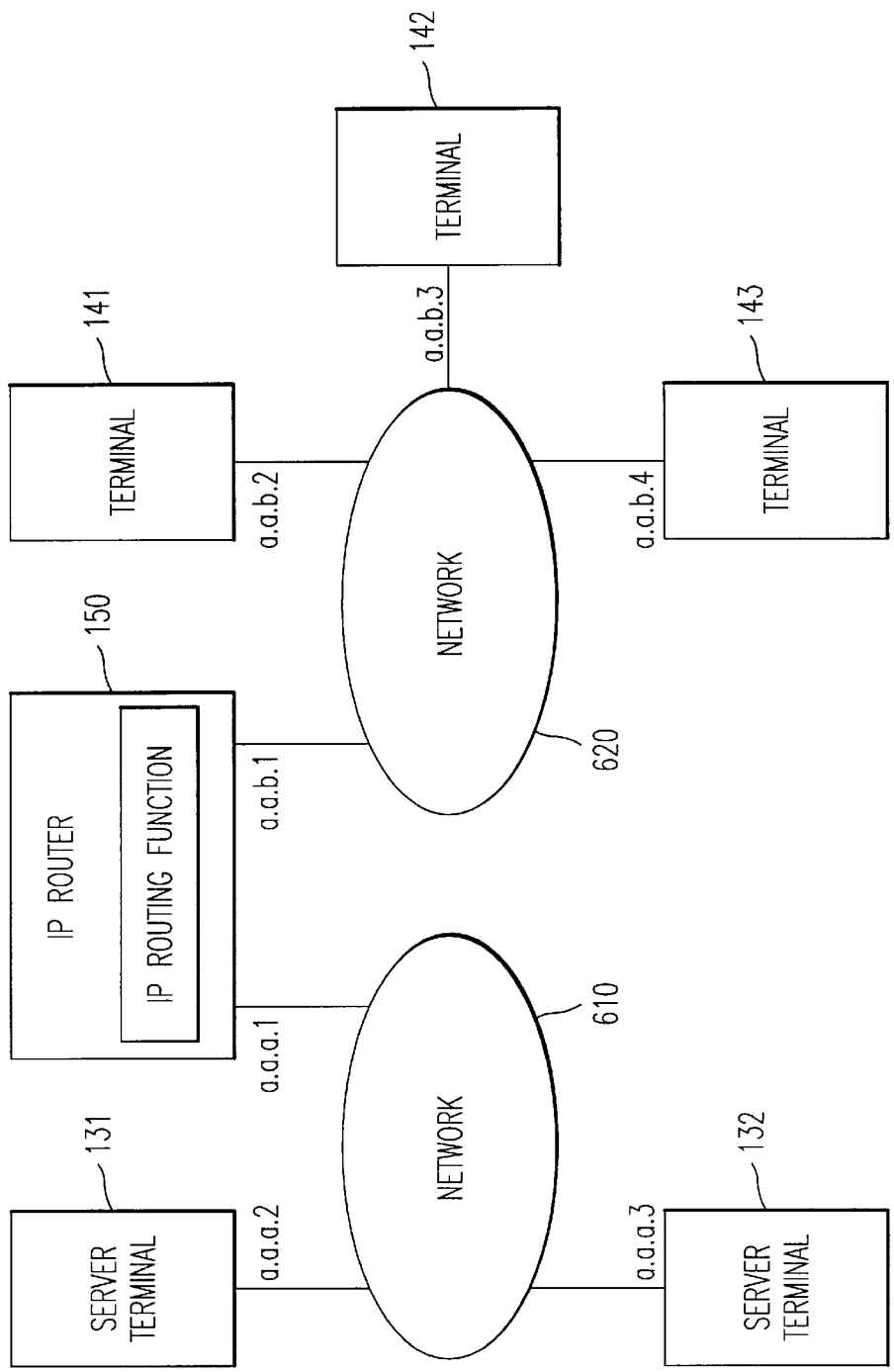
FIG. 1 is an example of a conventional network system.

Referring now to the drawings, wherein like reference numerals designate identical or corresponding parts throughout the several views, and more particularly to FIGS. 2–11 thereof, there are illustrated exemplary embodiments of the present invention.

In a network having a highly asymmetric channel, the narrower band taken in the direction from the client to the server may be pressed by many ACK messages before the wider band from the server to the client is consumed to the last. That is, many ACKs occupy Vup, and Vdown is limited by Vup, so the wider down-link band will not be fully utilized. However, according to the principle of the present invention, the size of the second TCP segment to be outputted from the second interface can be larger than that of the first TCP segment, and therefore the number of ACK messages for the entire transmission data can be reduced to improve the throughput from the server to the client.

In other words, according to the principle of the present invention, the TCP segment size can be so controlled that the TCP segment may be enlarged in the asymmetric channel as to be divided into a plurality of IP fragments. This makes it possible to reduce the number of the TCP segments for transmitting bulk data of the same size from the server terminal to the client terminal, so that the number of ACKs for the TCP segment is reduced. In the ordinary TCP implementation, the reduction in the number of ACKs makes use of the characteristics in which a plurality of ACKs are not returned to one TCP segment so long as the TCP segments flow smoothly (an overlapping ACK is not returned) and so long as the application at the client terminal continues reading the data sufficiently fast. (An ACK indicating that the closed reception window is widely opened is not transmitted.)

Moreover, if a communication device according to the principle of the present invention is introduced as the facilities of the network having an asymmetric channel, the communication device (which may be located at a boundary of an ordinary network and an asymmetric access network) can receive the TCP segments from a server and translate the size of the TCP segments to transmit the TCP segments to a client, and thus the current implementation of the TCP protocol can work as it is for the server terminal and the client terminal.

Figure 2:
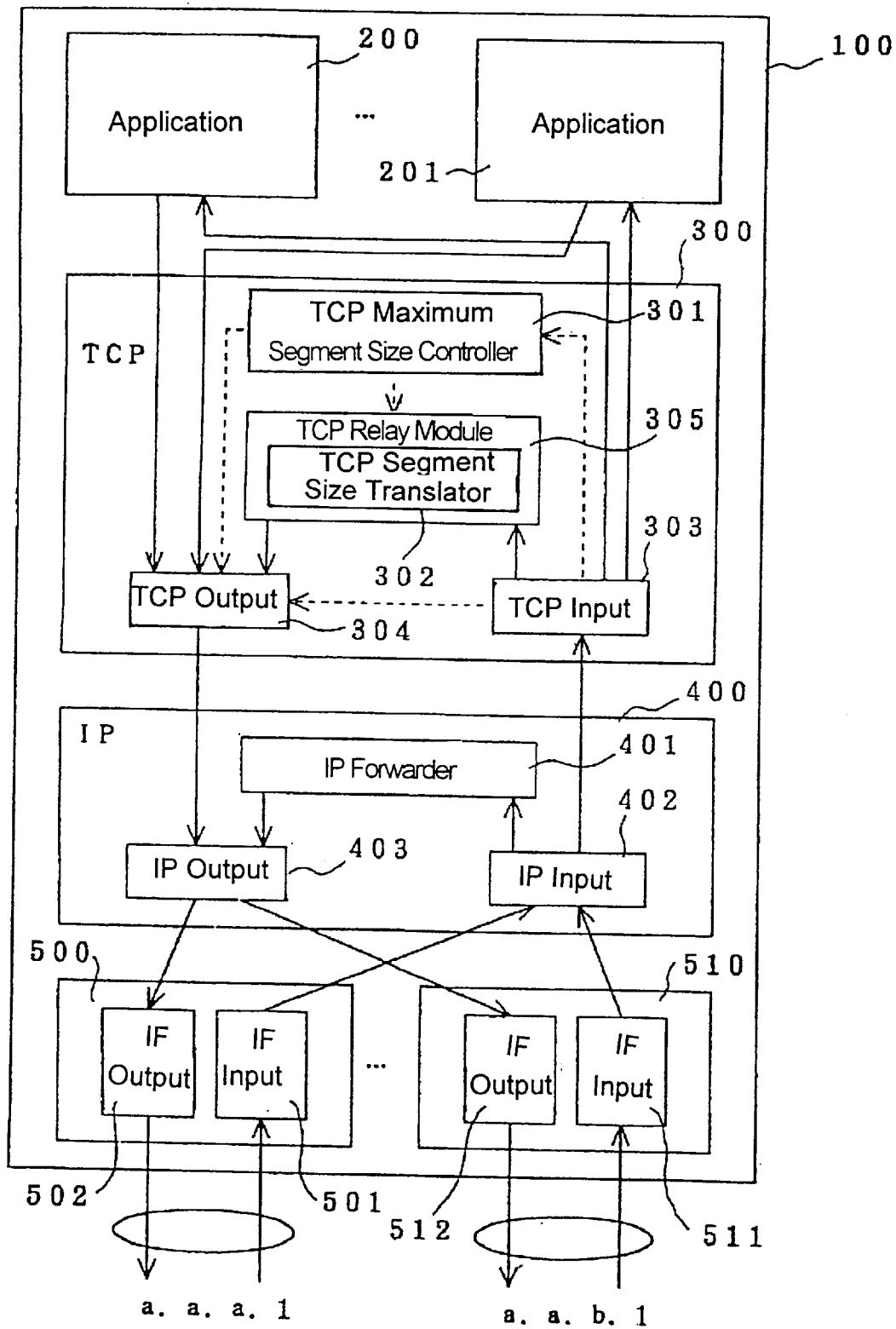
FIG. 2 is a functional block diagram showing a configuration of a communication device according to an embodiment of the present invention.

FIG. 2 shows a functional block diagram showing a configuration of a communication device according to an embodiment of the present invention.

A communication device 100 includes: applications 200 and 201; a TCP layer 300 including a TCP maximum segment size controller 301, a TCP input 303, a TCP output 304, a TCP relay module 305 including a TCP segment size translator 302; an IP layer 400 including an IP forwarder 401, an IP input 402 and an IP output 403; an IF (interface) unit 500 including an IF input 501 and an IF output 502 and having an IP address a.a.a.1; and an IF unit 510 including an IF input 511 and an IF output 512 and having an IP address a.a.b.1.

Here, the IF unit 500 is connected to a symmetric channel (or a later-described network 621) having equal input and output bandwidths, and the IF unit 510 is connected to an asymmetric channel (or a later-described network 630) in which the bandwidth at the output side is larger than that at the input side.

In FIG. 2, moreover, arrows of solid lines between the blocks indicate flows of data, and arrows of broken lines indicate flows of controls. Here are omitted from FIG. 2 the portions which have little relation to the embodiment, such as UDP units.

Figure 3:
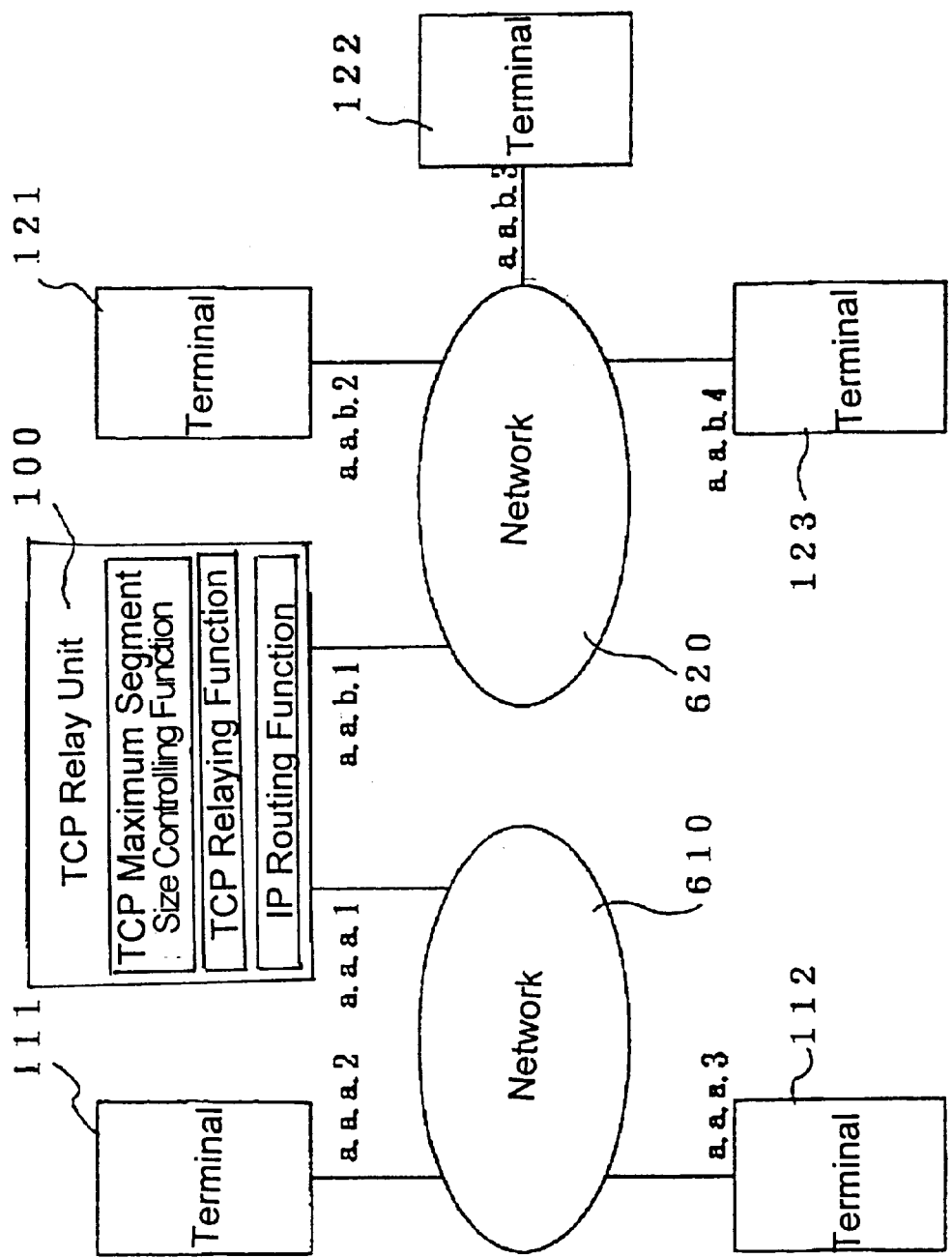
FIG. 3 shows an exemplary network system in which the communication device of the embodiment is provided.

FIG. 3 is an exemplary network system in which the communication device (TCP relay unit) 100 of the embodiment is provided.

A terminal 111 having an IP address a.a.a.2 and a terminal 112 having an IP address a.a.a.3 are connected to the network 610 having symmetric input/output channels.

A terminal 121 having an IP address a.a.b.2, a terminal 122 having an IP address a.a.b.3, and a terminal 123 having an IP address a.a.b.4 are connected to the network 620 having asymmetric channels. However, the individual terminals 121, 122 and 123 have a larger bandwidth at the input side than at the output side unlike the case of the communication device 100.

The IP layer 400 is different in the following points from the ordinary one.

In the ordinary IP layer, the IP input 402 hands over the IP datagram whose destination as address is a.a.a.1 or a.a.b.1 (which indicates its own device or host) to an upper layer (i.e., the TCP layer), and transfers the remainders to the IP forwarder 401. However, in this IP layer 400, the IP input 402 hands over the IP datagram to the TCP layer 300 when the destination address of the IP datagram is the address (i.e., the IP addresses a.a.b.2, a.a.b.3 and a.a.b.4 of the terminals 121, 122 and 123) of the terminal belonging to a predetermined network (i.e., the network 620) and the protocol of the IP datagram is the TCP. This IP datagram will be called the "TCP/IP datagram to be relayed". When the destination address of the IP datagram is the pre-registered network or host address and the protocol is other than the TCP, the IP datagram is transferred to the IP forwarder 401.

The TCP layer 300 is different in the following points from the ordinary TCP layer.

In the ordinary TCP layer, the TCP input 303 transfers the data, as fetched from the TCP segment, to the applications 200 and 201 corresponding to the destination port number. However, in this TCP layer 300, the TCP input 303 according to the embodiment transmits the data, as fetched from the TCP segment, to a TCP relay module 305, when the IP datagram to be forwarded to another network is contained in the TCP segment transferred from the IP input 402.

When a connection of the TCP is to be established by exchanging a SYN (Synchronize Flag) message, the TCP maximum segment size controller ordinarily adopts the smaller one of its own TCP maximum segment size (mss: Maximum Segment Size) and the TCP mss of the other end as the mss of the TCP connection. Here, the mss of its own is determined (although slightly different depending on the implementation optimization) on the basis of the value which is calculated by subtracting the header sizes of the TCP and the IP from the maximum transfer unit (MTU) size of IF units on the route of the connection. The mss of the other end is obtained from the option of the SYN message which is forwarded from the other end.

In the TCP maximum segment size controller 301 according to the embodiment, however, when either of the terminals connected by the TCP connection has the addresses (the IP addresses a.a.b.2, a.a.b.3 and a.a.b.4 of the terminals 121, 122 and 123) of the terminals belonging to a predetermined network (i.e., the network 620) (although the IP addresses a.a.a.1 and a.a.b.1 of the communication device 100 are not contained by the aforementioned IP datagram to be TCP-relayed but may be contained here), the value, which is larger than the difference of the MTU of the IF unit from the sizes of the headers of the TCP and the IP, is adopted as the mss of the TCP connection so that the fragmented IP datagram may flow to the IF unit 510 located at the side opposed to the terminals. When two TCP connections are connected in the communication device 100 (e,g., a TCP connection from the network 610 is terminated at TCP input 303 and the TCP data units is relayed onto another TCP connection from TCP output 304 to network 620), the mss of the TCP connection which connects the communication device and the terminal belonging to the predetermined network (e,g., the network 620) is set to the value determined as described above.

This value mss is given to the TCP output 304.

Here, when the communication device 100 is connected not directly to the pre-registered network but to the pre-registered network through one or more routers, for example (e.g., another network and a router are present between the communication device and the network 620), the mss is set to such a value that the fragmentation may be effected by any of the routers at the side of the registered network.

When the IP addresses of the source and the destination of the SYN message are different from the IP address of the communication device 100 at the SYN exchanging time, the TCP connection is relayed by the communication device 100. For this relaying case, the TCP maximum segment size controller 301 sets the threshold value of the TCP segment size translator 302 to the value mss or higher.

The TCP segment size translator 302 sends the data in the buffer, as received from the TCP input 303, to the TCP output 304 when the data exceeds the threshold value. The size of the buffer, as allocated by the TCP segment size translator 302, is determined (to about several times as large as the received window size) on the basis of the received window size, as located at the side of the terminals (i.e., the terminals 121, 122 and 123) belonging to the predetermined network (i.e., the network 620).

On the other hand, the TCP relay module 305 relays the SYN message, the FIN message and so on, as received from one of the TCP connections to be relayed in addition to the TCP segment size translator 302, to the other. On the other hand, the retransmission algorithm of the TCP re-transmitter, as realized by the TCP input 303 and the TCP output 304, is different in the following points from the ordinary TCP retransmission algorithm.

The TCP input 303 requests TCP output 304 to retransmit the missing segment with the sequence number in the duplicate ACK upon receiving one duplicate ACK, which has the same sequence number acknowledged by immediately previous ACK and consists of header only, in contrast to an ordinary TCP input function which requests the retransmission of the missing segment upon receiving three duplicate ACKs.

As soon as the sequence number of the TCP ACK to be received after the retransmission to the duplicate ACK has the already transmitted one, moreover, the TCP input 303 demands the TCP output 304 to transmit the TCP segment having that sequence number. Until receiving the TCP ACK having the sequence number not transmitted, the TCP input 303 then demands immediately the TCP output 304 to re-transmit the TCP segment having the sequence number indicated by the each received ACKs received consecutively after the duplicate ACK.

Figure 4:
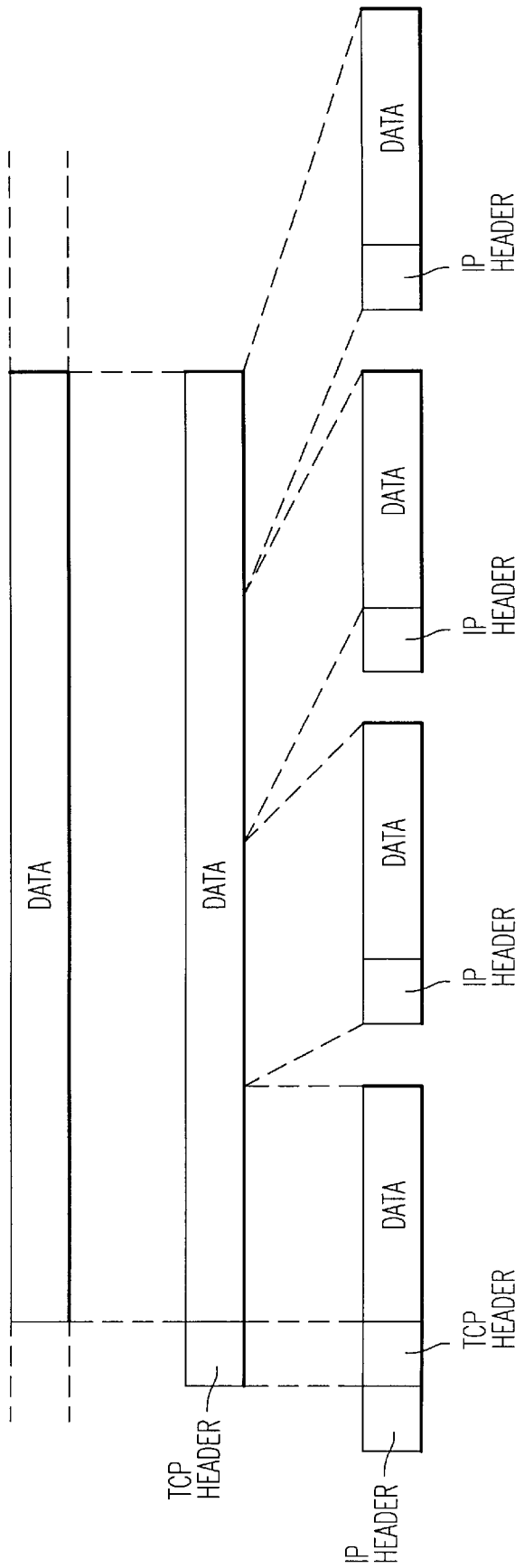
FIG. 4 is a schematic diagram showing a data format when a TCP segment is IP-fragmented according to the embodiment.

The data to be transmitted through the TCP by the application 200 or 201 in the communication device 100 thus constructed to the predetermined terminal 121, 122 or 123 take the form in which one TCP segment is fragmented into a plurality of IP datagrams, as shown in FIG. 4.

Figure 5:
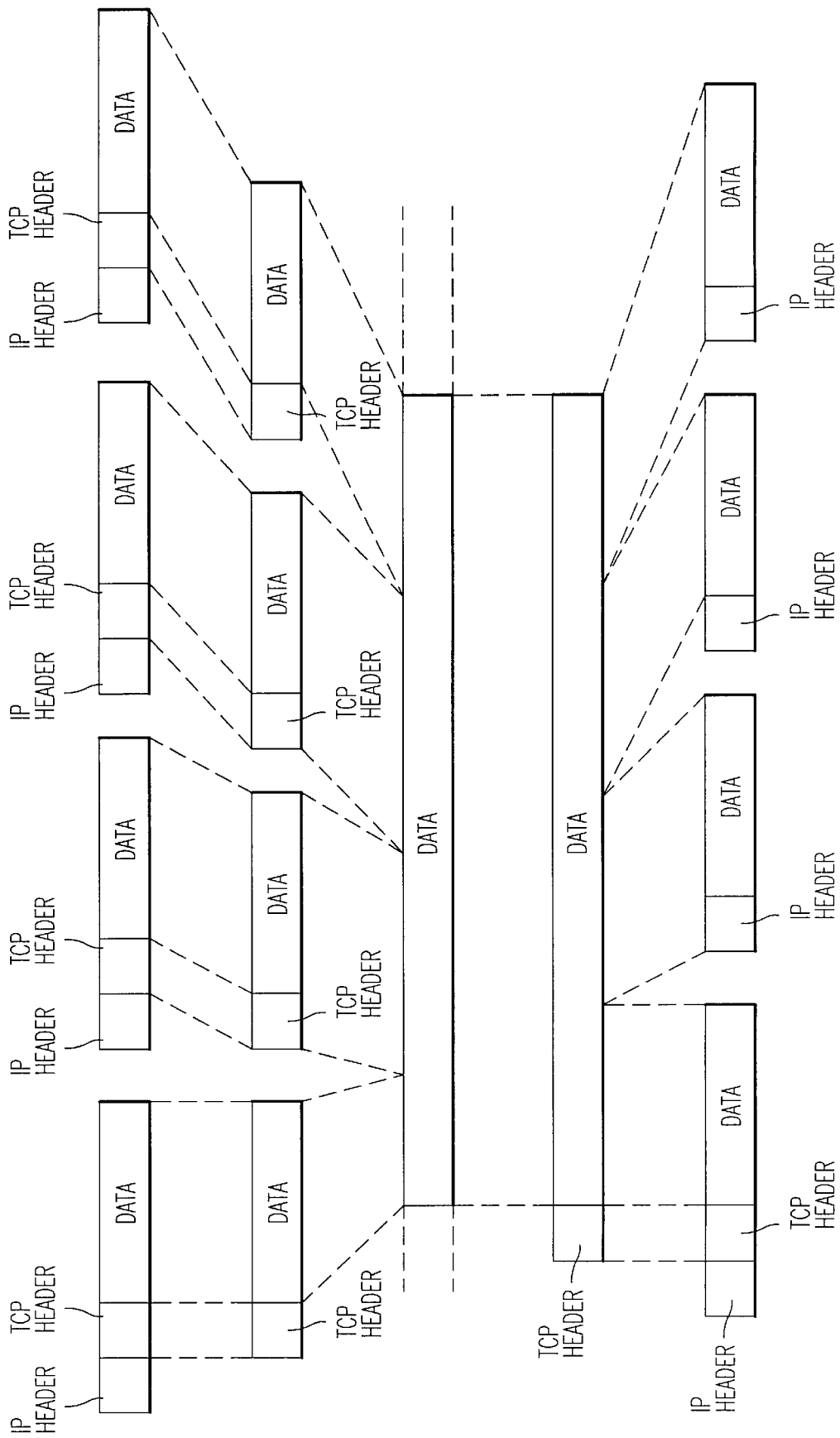
FIG. 5 is a schematic diagram showing a data format when a TCP segment size is translated according to the embodiment.

As shown in FIG. 5, on the other hand, the data to be transmitted through the TCP by the communication device 100 from the terminal 111 or 112 to the predetermined terminal 121, 122 or 123 are fetched (or raised to the TCP layer) by the communication device 100 and are once assembled to the initial data. Then, one TCP segment is so translated in size that it may be fragmented into a plurality of IP datagrams, and the data are then transmitted to the terminal 121, 122 or 123.

Even when a terminal (e.g., the terminal 121 or the like) belongs to a predetermined network (e.g., the network 620 or the like), the communication device acts as the ordinary TCP/IP communication device having no extension if that terminal denies the application of the additional function to the ordinary TCP/IP provided here. For example, it is possible to add the information demanding a denial for the TCP option of the SYN message from a terminal in the predetermined network.

Figure 6B:
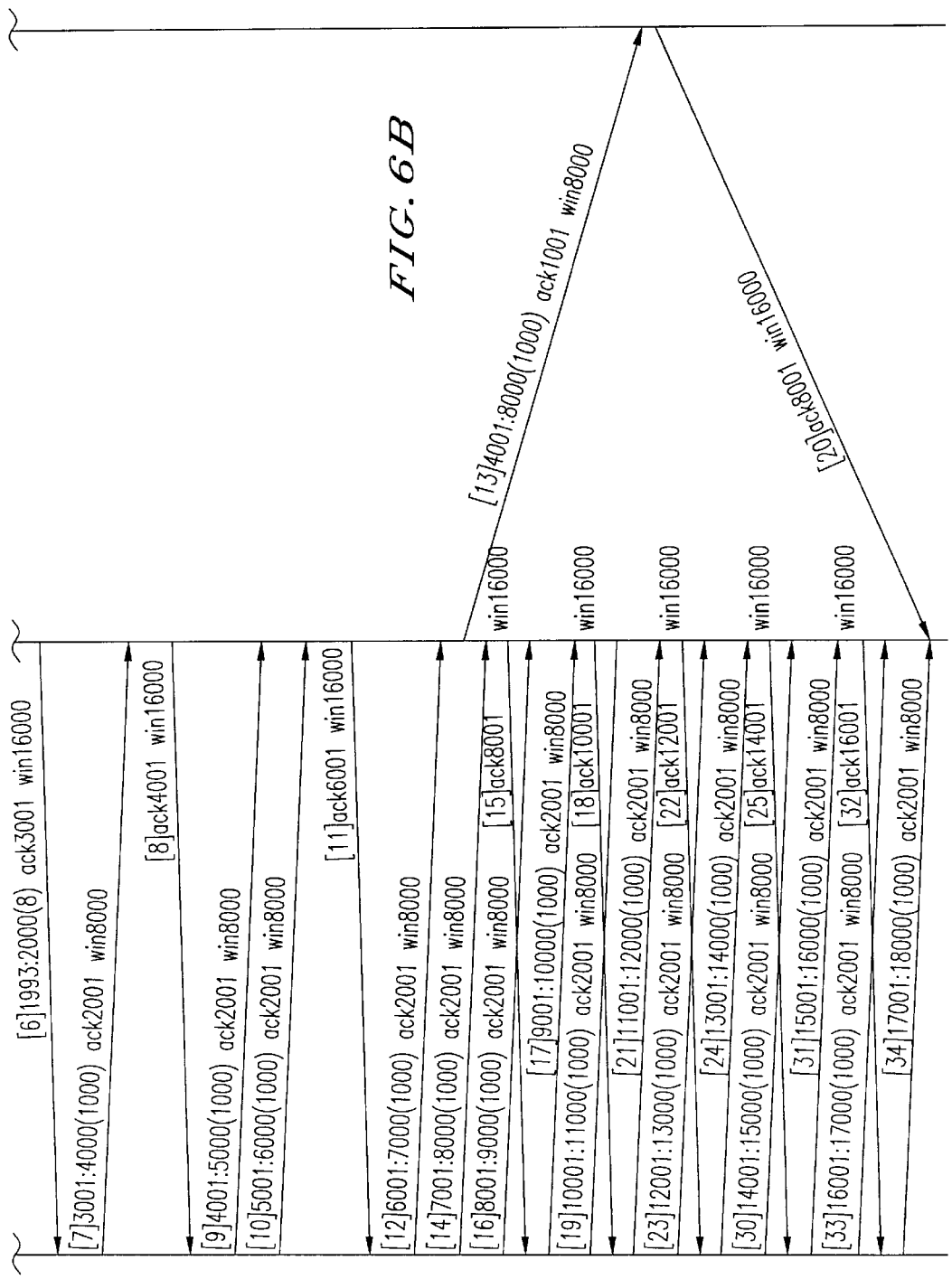
FIG. 6 is an exemplary sequence diagram when TCP data units are relayed by the communication device according to the embodiment.
Figure 7B:
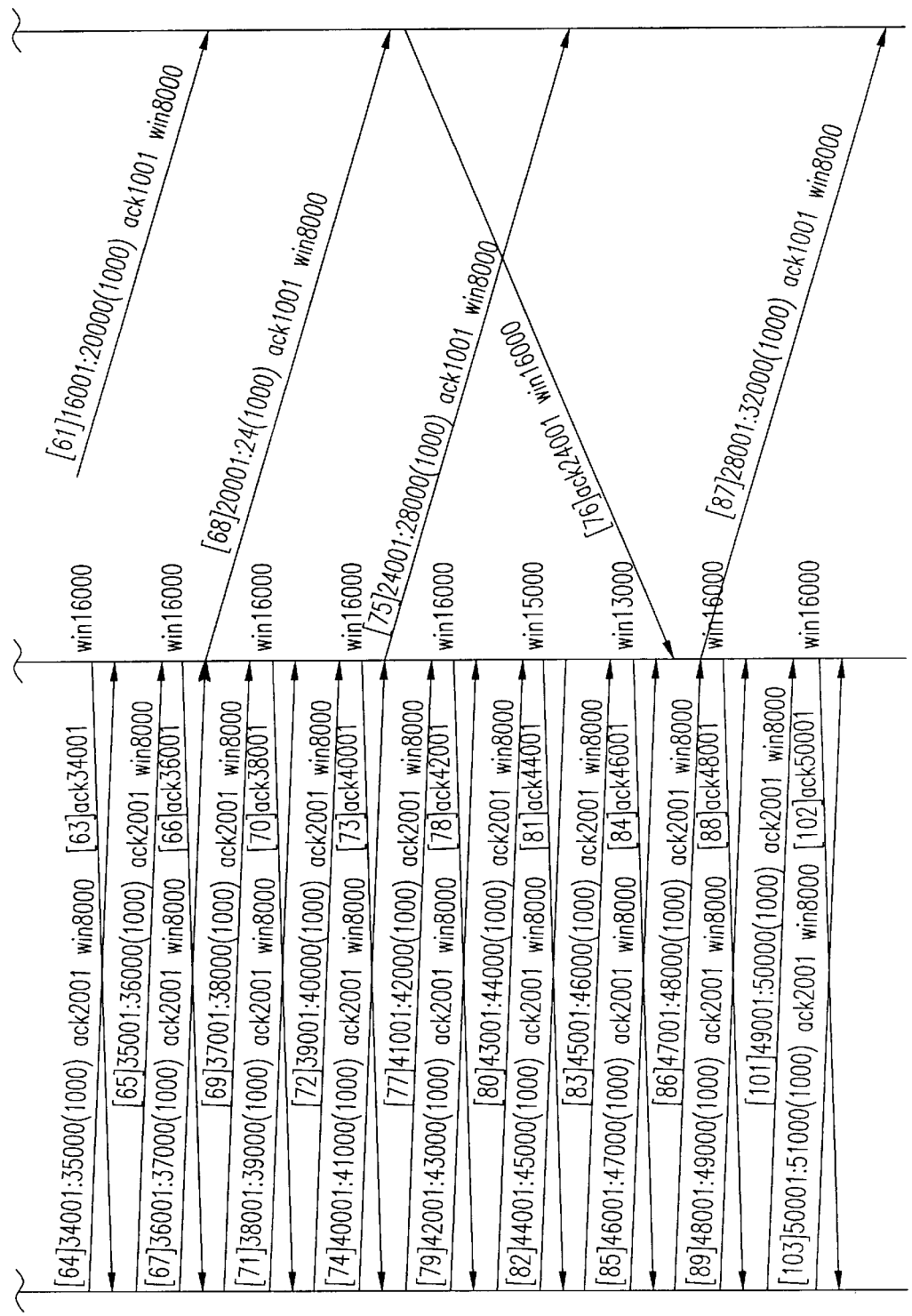
FIG. 7 is an exemplary sequence diagram when TCP data units are relayed by the communication device according to the embodiment.

The actions of the communication device 100 thus constructed will be described with reference to FIGS. 6 to 8.

Oblique arrows appearing in these Figures designates flows of the TCP segments, and the vertical length indicates the time period required for transmitting the segments. The gradients become larger for a constant bandwidth as the segment size becomes larger, and become smaller for a constant segment size as the bandwidth becomes larger.

The three bandwidths are equal in the directions from the server terminal to the TCP relay, from the TCP relay to the server terminal and from the TCP relay to the client terminals, but the bandwidth in the direction from the client terminals to the TCP relay is narrower than the foregoing three. In this example, more specifically, massive data are transferred from the server terminal (e.g., the terminal 111 or 112) belonging to the network 610 through the communication device 100 to the client terminal (e.g., the terminal 121, 122 or 123).

This client terminal transmits to the server terminal the SYN message [1] containing the information of a sequence number=992, a client terminal mss=1,000 and a offered window size=16,000. The IP input 402 of the TCP relay fetches the IP datagram to be ordinarily relayed by the IP layer, as the IP datagram to be relayed by the TCP and raises it to the TCP layer.

The TCP maximum segment size controller 301 sets the MSS of the TCP connection between the IP address a.a.b.1 of the TCP relay and the client terminals, to a predetermined value of 4,000, and transmits it to the TCP output control 304.

Moreover, the TCP maximum segment size controller 301 sets the threshold value of the TCP segment size translator 302 to 4,000.

On the other hand, the TCP segment size translator 302 allocates a buffer several times as large as the advertised window. In this case, buffer size is 48,000 which is three times as large.

The TCP relay module 305 relays the SYN message [1] as a SYN message [2].

The mss of the SYN message [2] may be determined by the same method as that of the case of the ordinary TCP connection which is terminated at the IP address a.a.a.1, and is generally unequal to the value of the SYN message [1]. The offered window size may not always be equalized. The buffer retains→The allocated buffer size, 48,000, could be adopted as the adovertised window size. If this reception window size is enlarged so much, the performance of the TCP may be lowered. Thus, the offered window size is set to 16,000.

Here, the examples in which the offered window size becomes smaller are indicated at ACKs [81] and [84].

The TCP relay module 305 relays a SYN message [3], as returned from the server terminal, as a SYN message [4] to the client terminal. The mss of the SYN message [4] is data for providing a basis to determine the size of the TCP segment transmitted from the client terminal. This mss can be made to have no relation to the TCP segment size transmitted from the TCP relay and may not to be the mss which is determined by the TCP maximum segment size control 402. Here, the mss is set to the value which is determined from the MTU size of the IF unit 510 of the IP address a.a.b.1. At this time, the buffer is allocated in the direction from the client terminal to the server terminal.

The client terminal send the command "get data" to the server as a TCP segment [5]. Then, the data from the client terminal to the server terminal are instantly transmitted as a TCP segment [6] to the server terminal.

The server terminal transmits a portion of the accordingly demanded data as TCP segments [7], [9], [10] and [12] to the client terminal.

The TCP relay fetches this or raises it to the TCP layer, and stores the transmitted data in the buffer of the TCP segment size translator 302 while returning ACKs [8] and [11].

The offered window size, as indicated in the ACK, is fixed at 16,000 so long as the remaining capacity of the buffer drops below 32,000.

Since the threshold value of the TCP segment size translator 302 is reached at the instant when the TCP segment [12] is received, the TCP segment size translator 302 demands the TCP output 304 to transmit the data in the buffer. Since the transmitted data reach the mss, the TCP output 304 instantly transmit the data as one TCP segment [13]. This TCP segment [13] is fragmented into four IP datagrams (as shown in FIG. 5) to reach the client terminal by the IP output 403.

In response to the TCP segments [19] and [30], the TCP segment size translator 302 reaches again the threshold value so that it demands the TCP output 304 to transmit the data in the buffer. By the limit (at 4,000) of the congested window determined by the well-known TCP slow start algorithm, the congested window size takes a value of 8,000 when the TCP output 304 receives an ACK [20]. Then, the TCP output 304 transmits two TCP segments [35] and [42] to the client terminal.

Then, the client terminal returns one ACK each time it receives two TCP segments. For the client terminal following the algorithm, it is apparent that the number of ACKs for transmitting the same data quantity becomes the smaller for the larger TCP segment size. The client terminal may return one ACK to one TCP segment (although not shown), the number of ACKs is also reduced as the TCP segment size is sufficiently enlarged. In the ordinary TCP implementation, a plurality of ACKs will not be returned to one TCP segment, so long as the TCP segments flows smoothly, any overlapping ACKs almost may not be generated, and so long as the application of the client terminal continues reading the data sufficiently quickly. In other words, so long as transmission of the ACK indicating that the closed reception window is widely opened almost may not be generated.

Figure 8A:
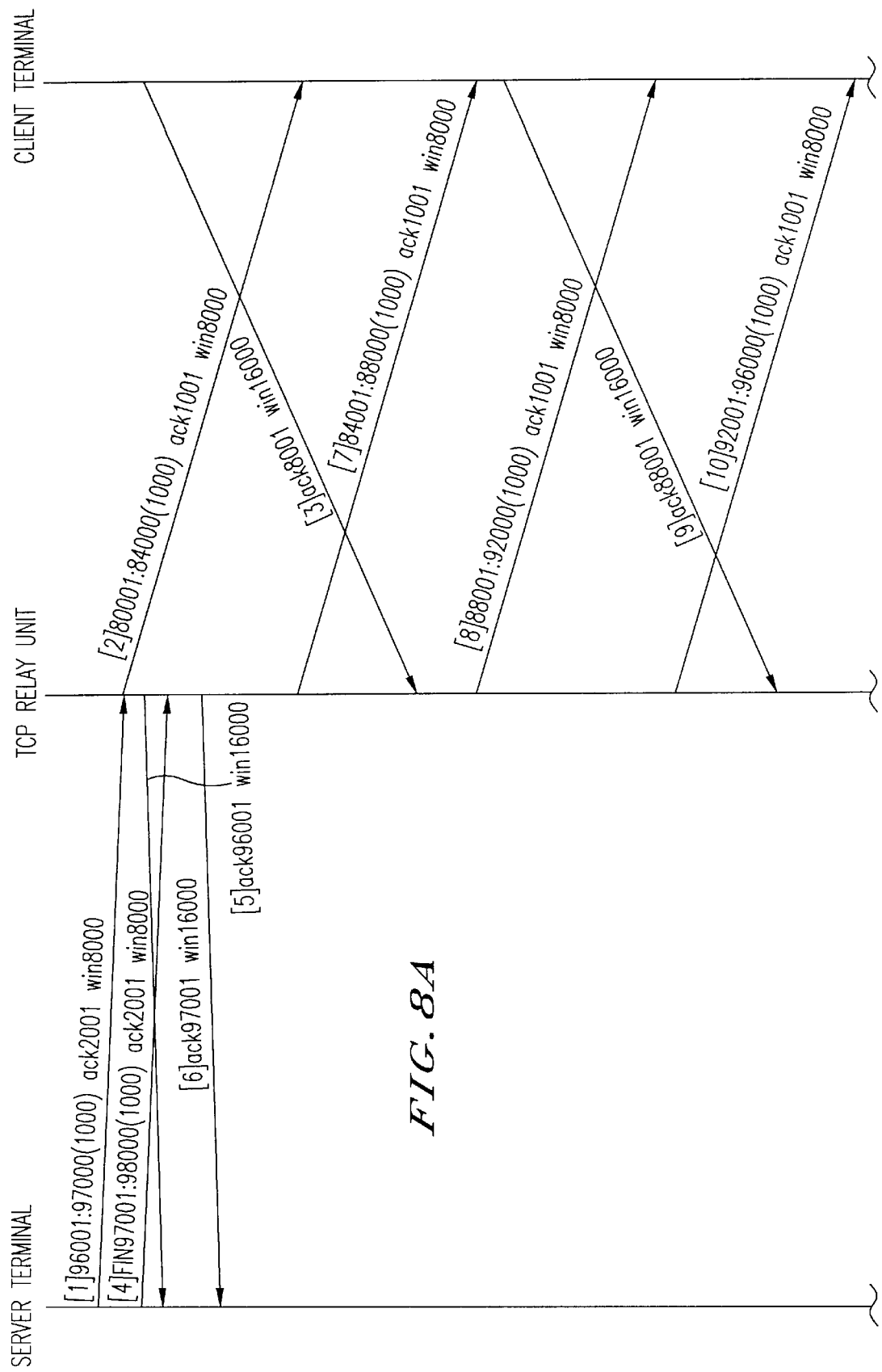
FIG. 8 is an exemplary sequence diagram when TCP connection is closed by the communication device according to the embodiment.
Figure 8B:
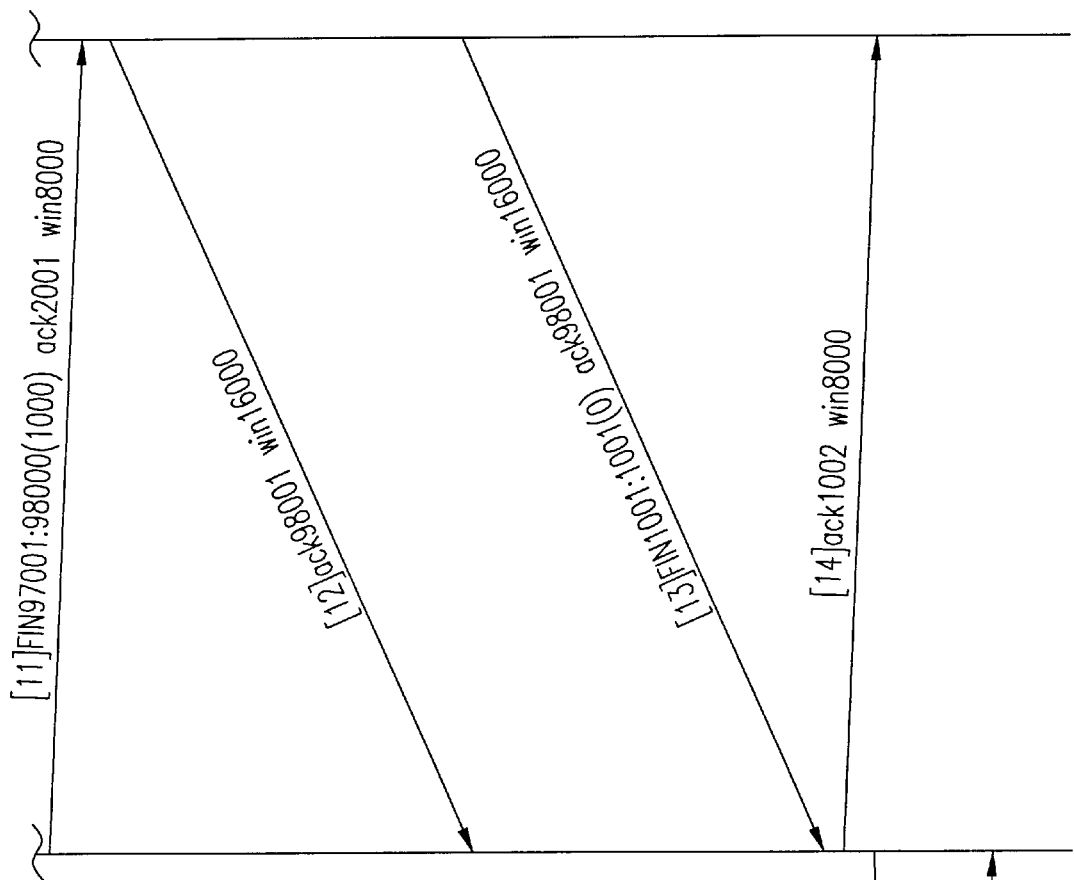

FIG. 8 shows a sequence diagram at a TCP relaying time by a communication device according to one embodiment of the invention.

The server terminal transmits the TCP segment [4] in which a FIN message is piggybacked on the last data. The TCP connection in the direction from the server terminal to the TCP relay is close by the ACK [5] of the TCP relay.

The TCP relay continues transmitting the data (i.e., the TCP segments [7], [8], [9] and [10]) to the client terminal till the buffer of the TCP segment size translator 302 is emptied. The data of the buffer does not exceed the threshold value but are adopted as the final ones because of the presence of the FIN to transmit the TCP segment [11] on which the FIN message is overlapped.

At the ACK [12], the TCP connection in the direction from the TCP relay to the client terminal is closed. In response to a demand for the application of the client terminal, the FIN message [13] is transmitted, and the TCP connection in the direction from the client terminal to the TCP relay is closed by the ACK [14] responding thereto. As a result, it is warranted that no more flow of data is in the direction from the TCP relay to the server terminal. Therefore, the TCP relay transmits a FIN message [15] to the server terminal. In response to the ACK [16], the last TCP connection remaining in the direction from the TCP relay to the server terminal is closed.

Figure 9:
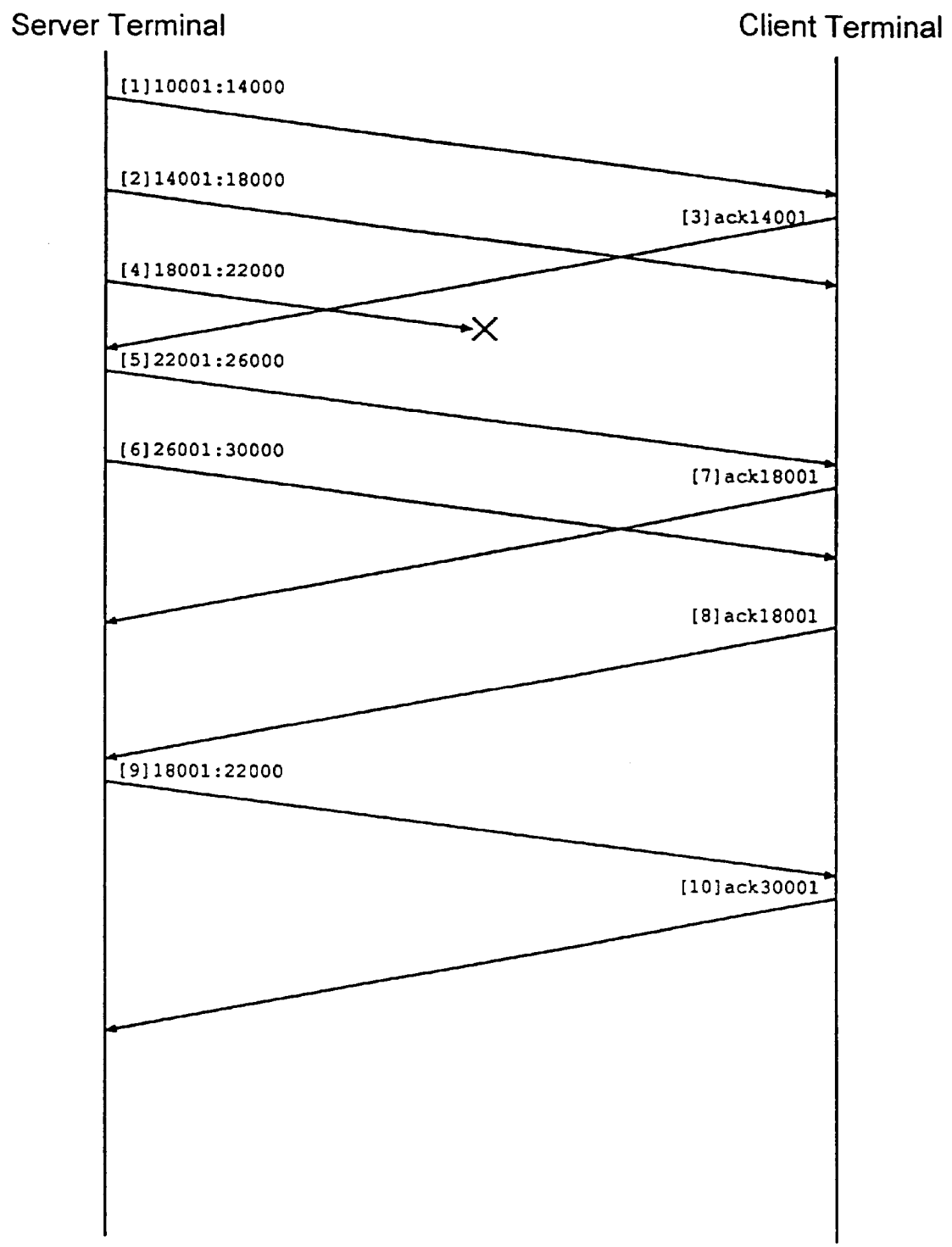
FIG. 9 is an exemplary sequence diagram when TCP segment is retransmitted by the communication device according to the embodiment.
Figure 10:
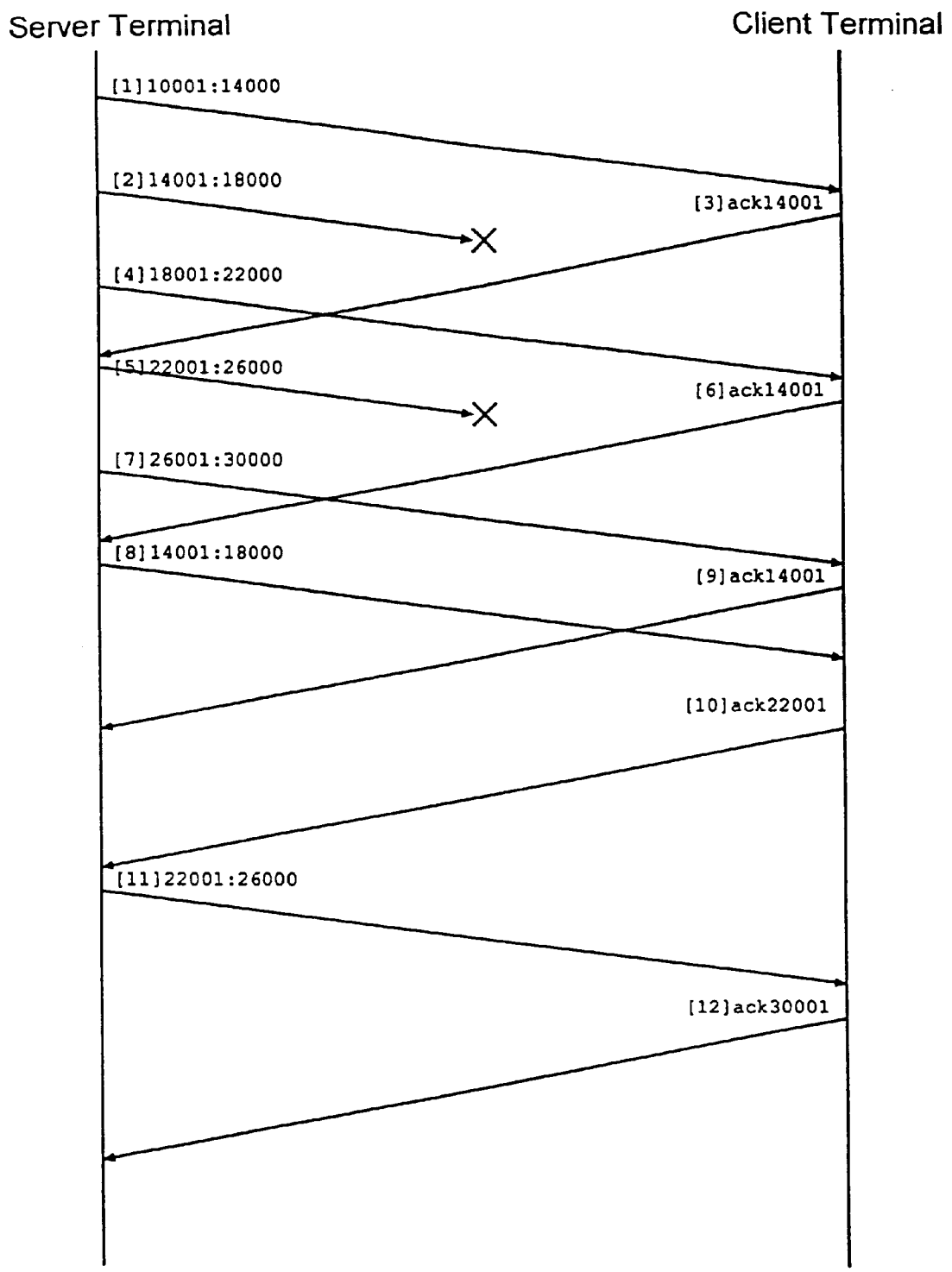
FIG. 10 is another exemplary sequence diagram when TCP segments are re-transmitted by the communication device according to the embodiment.

With reference to FIGS. 9 and 10, here will be described the case in which the communication device 100 itself communicates as the server terminal with the client terminal (i.e., the terminal 121, 122 or 123). The flows of the bulk data of the normal case, in which neither the setting or release of the TCP connection nor the bulk data flow without segment losses, will be omitted because they are substantially identical to the aforementioned example of actions from which the portions concerned with the relays are eliminated. Here will be stressed the retransmission control of the case in which the TCP segments are lost.

FIG. 9 shows the case in which a TCP segment [4] is lost in an initial state (at 16,000 in this example) with a sufficiently opened window from the server terminal to the client terminal.

The TCP segments [5] and [6] have a sequence number different from the expected value of 18,001 so that the client terminal returns the ordinary ACK [7] and the overlapping act [8].

Since the TCP segment size is intentionally enlarged, the number of duplicate ACKs is small for a relatively large window size so that the fast retransmission is not performed. In the standard TCP implementation, the threshold value is so set by considering the possible change in the order of the IP datagrams that the server terminal is not fast retransmitted before the duplicate ACKs take the number of three.

If this threshold value is adopted in the embodiment, however, the large TCP segment size reduces the duplicate ACKs for the window size so that the probability of not the fast retransmission but the retransmission by the time-out is raised to cause a defect that the throughput drops.

The asymmetric channels, for which the embodiment is effective, has to take little consideration into the disorder of the IP datagram, either because the communication device 100 and the client terminals are connected not through the routers or because the number of stages of the routers is so small that the paths are substantially fixed, if it is considered that many asymmetric channels are in the access network. This makes it possible to set the threshold value for the fast retransmission to one duplicate ACK. The retransmission of the TCP segment [9] is performed if it satisfies that condition.

FIG. 10 shows the case the TCP segments [2] and [5] are lost under the initial condition similar to that of FIG. 9. The TCP segment [8] is fast retransmitted by the duplicate ACK

[6], but the TCP segment [5] is not in the fast retransmission algorithm. The loss of a plurality of TCP segments in the window implies that the network is ordinarily congested, and this non-retransmission of the TCP segments aids in the restoration of the network from the congested state.

However, the asymmetric channels effective for the embodiment are frequently wireless so that the burst loss of the TCP segments does not mean the congestion.

In order to retransmit the TCP segment [5], therefore, if the fast retransmitted TCP segment (which can be interpreted to correspond to [8]) ACK ([10] in this case) acknowledges the already transmitted sequence number at the instant of the retransmission, the TCP segment ([11] in this case) is instantly retransmitted. After this until the receipt of ACK with sequence number which is not sent, the segment with the sequence number indicated by the each received ACKs received consecutively after the duplicate ACK will be retransmitted.

Figure 11:
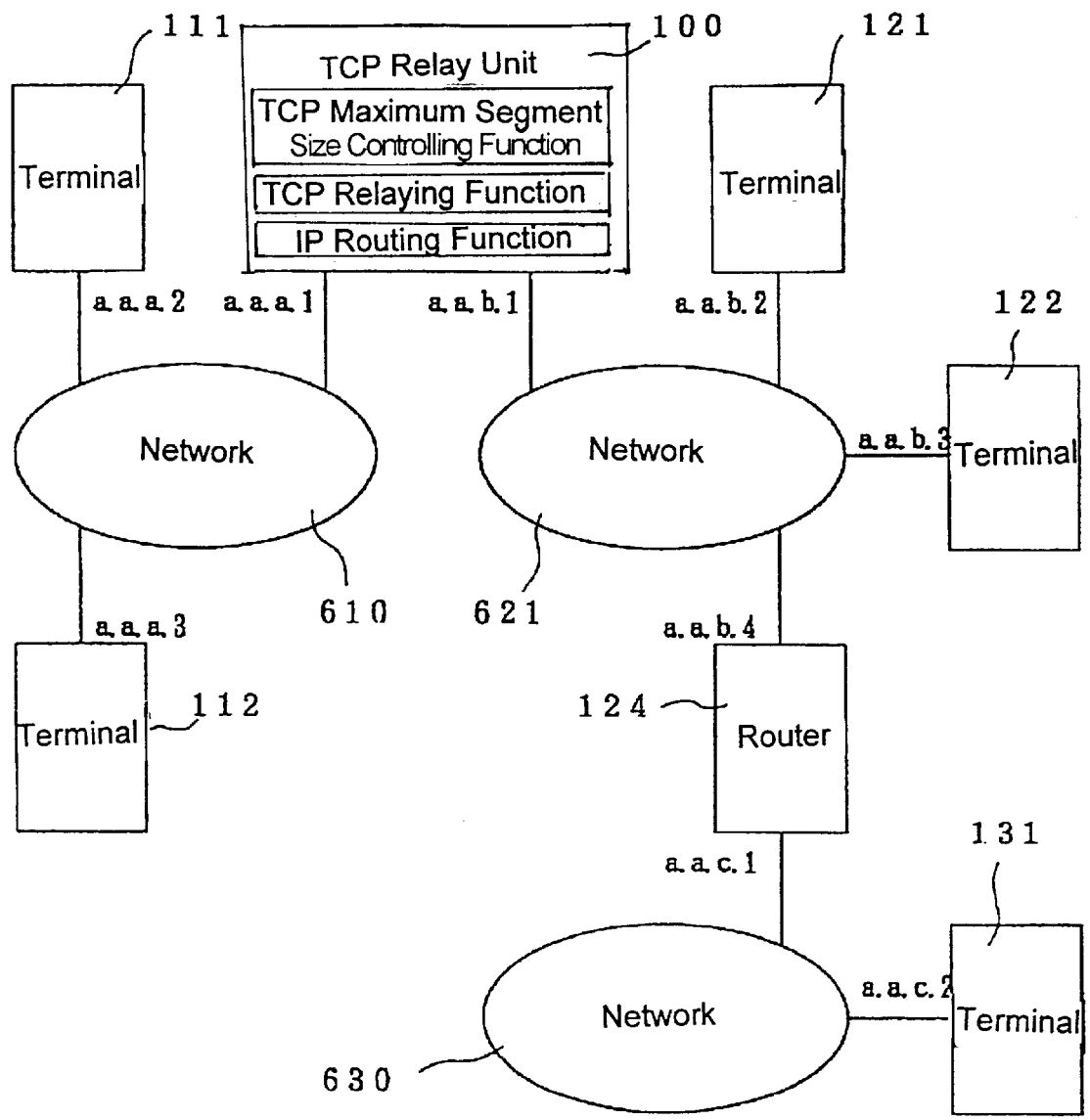
FIG. 11 shows another exemplary network system in which the communication device of the embodiment is provided.

With reference to FIG. 11, here will be described the actions of the case in which the communication device 100 is connected not directly but indirectly through a router 124 to a network 630 having an asymmetry.

Although the construction is substantially identical to that of FIG. 3, the band of the channel of the network 621 is symmetric unlike that of the network 620. The terminal 123 is replaced by the router 124, and a terminal 131 is added. Further added is the network 630 which has such an asymmetric channel that the bandwidth in the direction from the router 124 to the terminal 131 is wider than the bandwidth in the direction from the terminal 131 to the router 124.

When the terminal 111 or the terminal 112 is adopted as the server whereas the terminal 131 is adopted as the client, the communication device 100 controls the TCP segment size such that the TCP segment in the direction from the server to the client is fragmented in the network 630 into a plurality of IP datagrams. The specific detail will be omitted because it is substantially identical to the aforementioned one.

When the terminal 121 or the terminal 122 is adopted as the server, similar actions could also be achieved if the routing is set such that the IP datagram to be outputted is relayed once through the communication device 100 to the network 630 by the router 124. In addition to those already mentioned above, persons of ordinary skill will realize that many modifications and variations of the above embodiments may be made without departing from the novel and advantageous features of the present invention. Accordingly, all such modifications and variations are intended to be included within the scope of the appended claims.

The specification and examples are only exemplary. The following claims define the true scope and sprit of the invention.

What is claimed is:

1. A communication device, comprising:
   a first interface for inputting a first transport layer protocol data unit;
   a module for creating a second transport layer protocol data unit based on the first transport layer protocol data unit the second transport layer protocol data unit containing data as contained in the first transport layer protocol data unit and having a protocol data unit size different from a size of the first transport layer protocol data unit; and
   a second interface for outputting the second transport layer protocol data unit to a network,
   wherein the second interface has an asymmetry where an output bandwidth is larger than an input bandwidth.

2. The device according to claim 1, wherein
   the first interface is connected with another network and inputs the first transport layer protocol data unit from said another network.

3. The device according to claim 2, wherein
   the module includes a sub-module for terminating a first transport layer protocol connection which transfers the first transport layer protocol data unit from said another network and for transmitting the second transport layer protocol data unit onto a second transport layer protocol connection to said network.

4. The device according to claim 1, wherein the module includes a sub-module for controlling the protocol data unit size such that the protocol data unit size to be no larger than a size determined by subtracting a network layer protocol header size and a transport layer protocol header size from a maximum segment size for the second interface.

5. A communication device, comprising:
   a first interface for inputting a first transport layer protocol data unit;
   a module for creating a second transport layer protocol data unit based on the first transport layer protocol data unit, the second transport layer protocol data unit containing data as contained in the first transport layer protocol data unit and having a protocol data unit size different from a size of the first transport layer protocol data unit; and
   a second interface for outputting the second transport layer protocol data unit to a network,
   wherein the module includes a sub-module for controlling the protocol data unit size such that the protocol data unit size is larger than the size of the first transport layer protocol data unit.

6. The device according to claim 5, wherein
   the module creates the second transport layer protocol data unit from a plurality of first transport layer protocol data units.

7. The device according to claim 5, wherein
   the module includes a sub-module for dividing the second transport layer protocol data unit into a plurality of network layer protocol units to be outputted from the second interface, each network layer protocol unit including a network layer protocol header and at least one of the plurality of network layer protocol units including a transport layer protocol header.

8. A communication device, comprising:
   a first interface for inputting a first transport layer protocol data unit;
   a module for creating a second transport layer protocol data unit based on the first transport layer protocol data unit, the second transport layer protocol data unit containing data as contained in the first transport layer protocol data unit and having a protocol data unit size different from a size of the first transport layer protocol data unit;
   a second interface for outputting the second transport layer protocol data unit to a network; and
   a module for examining a network layer destination address of the first transport layer protocol data unit, and for handing the first transport layer protocol data unit over to the module for creating if the network layer destination address indicates a network which has an asymmetry where a down-link bandwidth is larger than an up-link bandwidth.

9. A communication device, comprising:

a first interface for inputting a first transport layer protocol data unit;

a module for creating a second transport layer protocol data unit based on the first transport layer protocol data unit, the second transport layer protocol data unit containing data as contained in the first transport layer protocol data unit and having a protocol data unit size different from a size of the first transport layer protocol data unit;

a second interface for outputting the second transport layer protocol data unit to a network; and a module for re-transmitting the second transport layer protocol data unit when one duplicate transport layer protocol acknowledgment message is received through the second interface.

10. A communication device, comprising:

a first module for creating a first transport layer protocol data unit having a size where one first transport layer protocol data unit can be encapsulated in one network layer protocol data unit;

a second module for creating a second transport layer protocol data unit having a size where one second transport layer protocol data unit is divided into a plurality of network layer protocol data unit;

a first interface for outputting the first transport layer protocol data unit to a first network; and a second interface for outputting at least one of the first and the second transport layer protocol data units to a second network, wherein the second interface has an asymmetry where an output bandwidth is larger than an input bandwidth.

11. The device according to claim 10, further comprising a module for determining whether to create the second transport layer protocol data unit or to create the first transport layer protocol data unit, for data to be outputted from the second interface, according to an attribute of a terminal which is to receive the data.

12. A communication device, comprising:

an interface for connecting with a first network, the first network being connected with a second network having an asymmetry where a bandwidth in a direction from the first network to the second network is larger than a bandwidth in an opposite direction; and a module for creating a transport layer protocol data unit to be divided into a plurality of network layer protocol data units in the second network, when the transport layer protocol data unit is to be transferred through the interface from the first network to the second network.

13. A communication method, comprising steps of:

inputting a first transport layer protocol data unit;

creating a second transport layer protocol data unit based on the first transport layer protocol data unit the second transport layer protocol data unit containing data as contained in the first transport layer protocol data unit and having a protocol data unit size different from a size of the first transport layer protocol data unit; and outputting the second transport layer protocol data unit to a network, wherein the outputting step outputs the second transport layer protocol data from an interface having an asymmetry where an output bandwidth is larger than an input bandwidth.

14. The method according to claim 13, wherein the inputting step inputs the first transport layer protocol data unit from another network.

15. The method according to claim 14, further comprising steps of:

terminating a first transport layer protocol connection which transfers the first transport layer protocol data unit from said another network; and transmitting the second transport layer protocol data unit onto a second transport layer protocol connection to said network.

16. The [device] method according to claim 13, further comprising a step of controlling the protocol data unit size such that the protocol data unit size to be no larger than a size determined by subtracting a network layer protocol header size and a transport layer protocol header size from a maximum segment size for the network.

17. A communication method, comprising the steps of:

inputting a first transport layer protocol data unit;

creating a second transport layer protocol data unit based on the first transport layer protocol data unit, the second transport layer protocol data unit containing data as contained in the first transport layer protocol data unit and having a protocol data unit size different from a size of the first transport layer protocol data unit;

outputting the second transport layer protocol data unit to a network; and controlling the protocol data unit size such that the protocol data unit size is larger than the size of the first transport layer protocol data unit.

18. The method according to claim 17, wherein the creating step creates the second transport layer protocol data unit from a plurality of first transport layer protocol data units.

19. The method according to claim 17, further comprising a step of dividing the second transport layer protocol data unit into a plurality of network layer protocol units to be outputted to the network, each network layer protocol unit including a network layer protocol header and at least one of the plurality of network layer protocol units including a transport layer protocol header.

20. The method according to claim 17, further comprising a step of re-transmitting the second transport layer protocol data unit when one duplicate transport layer protocol acknowledgment message is received from the network.

21. A communication method, comprising the steps of:

inputting a first transport layer protocol data unit;

creating a second transport layer protocol data unit based on the first transport layer protocol data unit, the second transport layer protocol data unit containing data as contained in the first transport layer protocol data unit and having a protocol data unit size different from a size of the first transport layer protocol data unit;

outputting the second transport layer protocol data unit to a network; and examining a network layer destination address of the first transport layer protocol data unit, wherein the creating step creates the second transport layer protocol data unit based on the first transport layer protocol data unit if the network layer destination address indicates a network which has an asymmetry where a down-link bandwidth is larger than an up-link bandwidth.

* * * * *